United States Patent
Ebuchi

(10) Patent No.: US 8,259,315 B2
(45) Date of Patent: Sep. 4, 2012

(54) INFORMATION PROCESSING APPARATUS, PRINT SETTING METHOD, AND STORAGE MEDIUM FOR CHANGING DEFAULT SETTING INFORMATION

(75) Inventor: Kazuhisa Ebuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 12/136,696

(22) Filed: Jun. 10, 2008

(65) Prior Publication Data

US 2008/0304092 A1 Dec. 11, 2008

(30) Foreign Application Priority Data

Jun. 11, 2007 (JP) ................................ 2007-153710

(51) Int. Cl.
G06F 3/12 (2006.01)
(52) U.S. Cl. ...... 358/1.13; 358/1.15; 719/321; 719/327; 709/203; 709/223
(58) Field of Classification Search .............. 358/1.13, 358/1.15; 719/321, 327; 709/203, 223
See application file for complete search history.

(56) References Cited

U.S. PATENT DOCUMENTS

| 2002/0083131 A1* | 6/2002 | Machida ................. 709/203 |
| 2006/0103867 A1* | 5/2006 | Kato ....................... 358/1.13 |
| 2006/0206605 A1* | 9/2006 | Machida ................. 709/223 |
| 2006/0224876 A1* | 10/2006 | Kato ....................... 713/1 |

FOREIGN PATENT DOCUMENTS

| JP | 2000-185450 A | 7/2000 |
| JP | 2003-157174 A | 5/2003 |
| JP | 2004-038296 A | 2/2004 |
| JP | 2004-213132 A | 7/2004 |
| JP | 2006-277345 A | 10/2006 |
| JP | 2006-285476 A | 10/2006 |

OTHER PUBLICATIONS

Microsoft 2008, Windows Driver Kit: Print Devices, Introduction to Point and Print, p. 1 of 1.
Japanese Office Action for Japanese Application No. 2007-153710 dated Jan. 5, 2012.

* cited by examiner

Primary Examiner — Jacky X Zheng
(74) Attorney, Agent, or Firm — Carter, DeLuca, Farrell & Schmidt, LLP

(57) ABSTRACT

An information processing apparatus having a printer driver installed thereon and configured to be in communication with a printing apparatus includes a setting changing unit configured to generate an instruction to the printer driver to change a setting value for default setting information stored in the printer driver described in a setting file for instructing changing of a setting value for the printer driver.

5 Claims, 14 Drawing Sheets

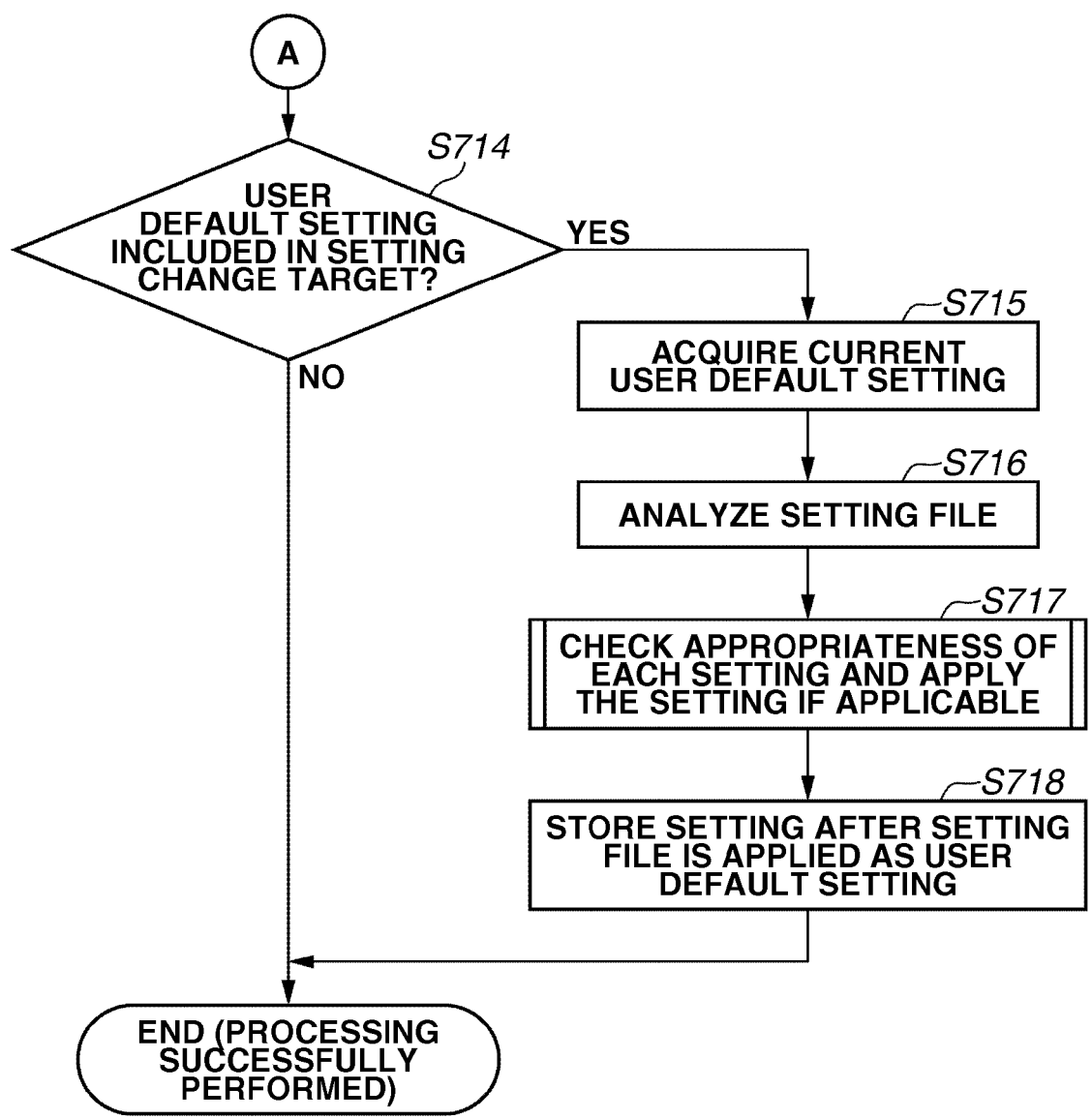

FIG.14

STORAGE MEDIUM SUCH AS FD/CD-ROM

| DIRECTORY INFORMATION |
|---|
| PROGRAM CODE CORRESPONDING TO STEPS IN FLOW CHART OF FIG. 5 |
| PROGRAM CODE CORRESPONDING TO STEPS IN FLOW CHART OF FIGS. 7A AND 7B |
| PROGRAM CODE CORRESPONDING TO STEPS IN FLOW CHART OF FIG. 9 |
| PROGRAM CODE CORRESPONDING TO STEPS IN FLOW CHART OF FIG. 10 |
| PROGRAM CODE CORRESPONDING TO STEPS IN FLOW CHART OF FIG. 11 |
|  |
|  |
|  |

INFORMATION PROCESSING APPARATUS, PRINT SETTING METHOD, AND STORAGE MEDIUM FOR CHANGING DEFAULT SETTING INFORMATION

BACKGROUND OF THE INVENTION

1. Field of the Invention

The present invention relates to an information processing apparatus capable of communicating with a printing apparatus and to a print setting method therefor.

2. Description of the Related Art

In performing print processing with a printer from a computer, it is generally performed to set various print settings including items such as a type of paper, the number of copies, and a layout, using a printer driver installed on the computer. Hereinafter, in the present exemplary embodiment, each of the items is referred to as a "setting item". Further, a specific content of the setting item is hereinafter referred to as a "setting value". For example, in the case of the setting item "paper type", the setting value for the paper type can include plain paper or glossy paper. Furthermore, "print setting information", in principle, refers to information describing a setting value for each of the setting items.

The print setting information in an initial state, in which a printer driver is installed on a computer, generally includes, as a preset, a setting combination that can be regarded general or a setting combination with which the printer can operate in a well-balanced operation state.

Here, the "print setting information in an initial state" refers to a print setting preset at the time of shipping of a printer. Hereinafter, the "print setting information in an initial state" is simply referred to as a "driver default". In this regard, considering a case where a user desires to constantly apply a setting other than an initial setting, an operating system (OS) premised on a multi-user environment includes a function for storing one combination of desired settings for each user account as a normal setting. Hereinafter, in the present exemplary embodiment, print setting information set for each user account is simply referred to as a "user default". Here, the "OS premised on a multi-user environment" includes Windows® 2000, Windows® XP, and Windows Vista® of the Microsoft Corporation.

In a general case of print processing, an application, with respect to current print setting information acquired from a printer driver, performs a change in the setting for an item that the application requires to set and generates a print job without performing a change in the setting items other than the required items.

Accordingly, it is useful to use the above-described function of an OS for storing items that an application does not change as default settings, which saves the time for changing a setting at every print processing and greatly improves the efficiency of a print operation.

Japanese Patent Application Laid-Open No. 2004-213132 discusses a method for distributing a printer driver having a desired initial setting to a plurality of computers on a network.

Furthermore, Japanese Patent Application Laid-Open No. 2000-185450 discusses a method for applying the same setting for a plurality of users by exporting default setting information of a user as a file and importing the file on a printer driver of another user.

Moreover, Japanese Patent Application Laid-Open No. 2003-157174 discusses a method for changing arbitrary settings via a setting user interface (UI) of a printer driver of a server and importing the settings to a printer driver of a client as a file. The above-described conventional methods may be useful in applying the same setting on a plurality of computers.

However, in "Introduction to Point and Print" in Windows Driver Kit (WDK) Documentation attached to Windows Driver Development Kit of the Microsoft Corporation, it is necessary to prepare a network environment described therein. Accordingly, in the case of a large-scale printing system, one printer may be connected to one computer regardless of a relationship between computers (for example, a print server and a client personal computer (PC)). In the case where it is desired to uniformly change the default settings, it is necessary to display a driver setting UI to perform a change for all terminals. This may degrade the operation efficiency.

In the method discussed in Japanese Patent Application Laid-Open No. 2004-213132, it is necessary to install a printer driver on a distribution destination computer to apply a setting. Accordingly, with this method, a setting cannot be changed with a simple and easy operation. In the methods discussed in Japanese Patent Application Laid-Open No. 2000-185450 and Japanese Patent Application Laid-Open No. 2003-157174, it is not necessary to reinstall a printer driver. Accordingly, a setting can be changed by an operation easier than that in the case of the method discussed in Japanese Patent Application Laid-Open No. 2004-213132. However, in the case of these two conventional methods, it is also necessary to perform a complicated operation. That is, in the methods discussed in Japanese Patent Application Laid-Open No. 2000-185450 and Japanese Patent Application Laid-Open No. 2003-157174, it is necessary to at least once display a setting UI of a printer driver (a setting export source), then change each setting item by a user manual operation of an input device, such as a mouse or a keyboard, and then press an OK button or an "apply settings" button to store the setting.

The above-described conventional methods have the following problems because the conventional methods export all setting items set by the printer driver as files. That is, in the case where versions of printer drivers differ from each other between the export source and the import destination and if the number of setting items differs between them, it is difficult to maintain compatibility between them.

Furthermore, in the above-described conventional methods, all settings are overwritten with the setting for the export source even in the case where items in the already-set print setting information, other than specific items desired to be changed, are desired not to be changed from the already-performed setting for each user (or each printing system). This may degrade user convenience.

In general, a printer driver includes a resetting method for restoring an initial state of the printer driver, considering a case where a user has changed any print setting by mistake. However, the content to be restored by the resetting method is that in the driver default setting. Accordingly, in this case, the following problems may arise.

That is, in the case where, after changing from a default setting to a desired setting by any of the above-described methods, the changed setting has been further changed and saved by mistake, the resetting method cannot be used to restore the desired setting. Furthermore, in any of the above-described conventional methods, a user cannot flexibly and arbitrarily select which of a driver default, a system default, and a user default is to be set as a default setting customization target.

That is, with the above-described conventional methods, a user cannot flexibly and freely change and set an effective scope of a default setting on a printer driver.

SUMMARY OF THE INVENTION

The present invention is directed to an information processing apparatus capable of appropriately changing a default setting set for a specific setting item in print setting information.

According to an aspect of the present invention, an information processing apparatus having a printer driver installed thereon and configured to be in communication with a printing apparatus includes a setting changing unit configured to generate an instruction to the printer driver to change a setting value for default setting information stored in the printer driver described in a setting file for instructing changing of a setting value for the printer driver.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 7B is a flow chart illustrating an example of data processing performed by the information processing apparatus according to the second exemplary embodiment of the present invention.

FIG. 14 illustrates a memory map of a storage medium that stores various data processing programs that can be read by an information processing apparatus according to an eighth exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Now, an exemplary embodiment of the present invention will be described below. A print setting can include a duplex print setting, which is intended to save print paper sheets, and a monochromatic print setting, which is intended to decrease an amount of an ink to be used. An example of a setting UI via which a user can perform such a print setting is illustrated in FIG. 15.

Figure 15:
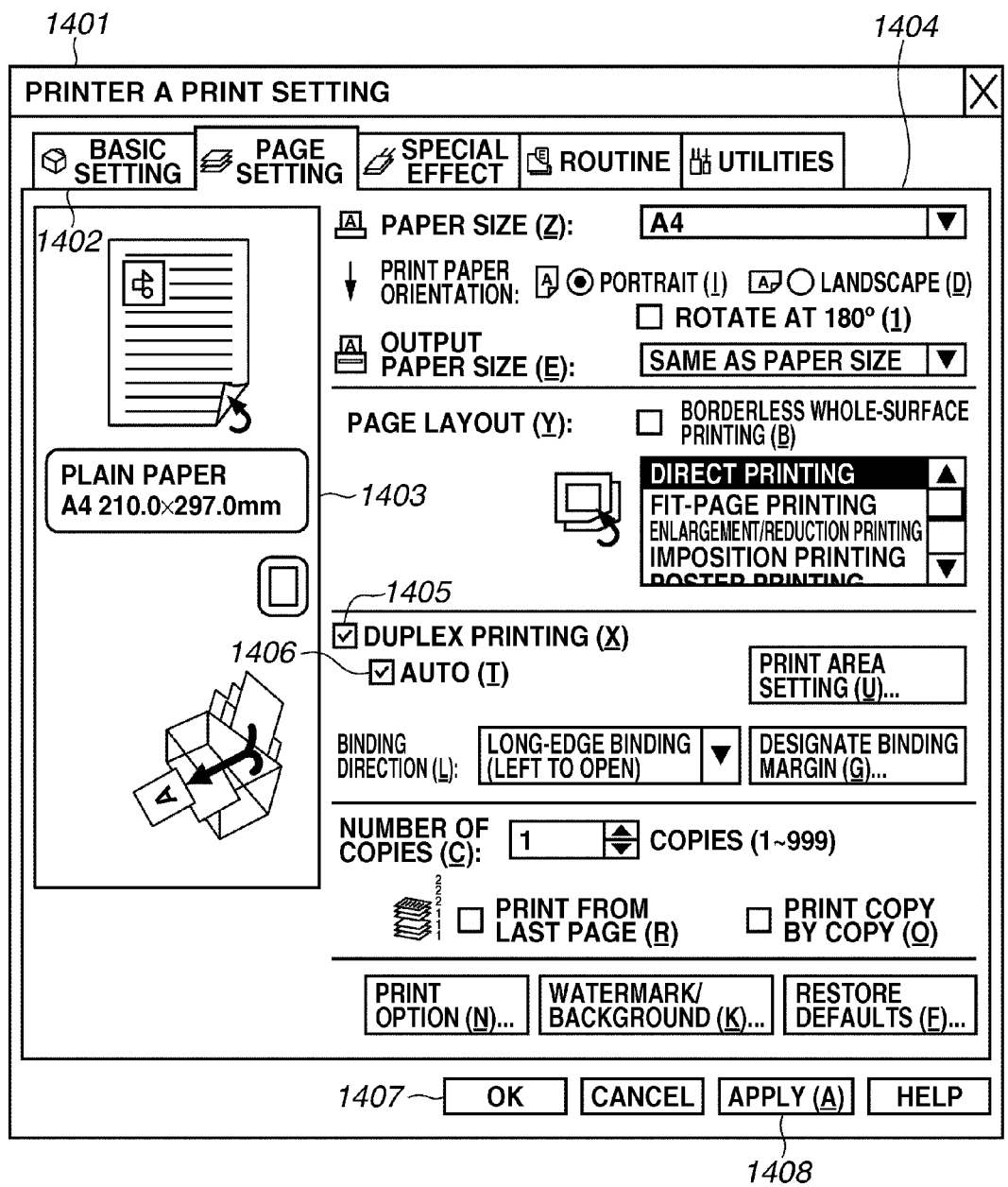
FIG. 15 illustrates an example of a UI displayed on an information processing apparatus according to an exemplary embodiment of the present invention.

FIG. 15 illustrates an example of a UI displayed on an information processing apparatus according to an exemplary embodiment.

Referring to FIG. 15, a window 1401 is a setting UI window displayed to set a user default according to an exemplary embodiment. In most cases, settings related to printing are categorized and displayed on a screen as tabs (tabs 1402 in FIG. 15). In the example in FIG. 15, a page setting tab sheet for performing a setting related to a page is displayed.

A user verifies an outline of all current settings by referring to a field 1403. The user changes content of each print setting item displayed in a field 1404 to a desired content.

The user performs a setting as to whether to perform a duplex printing via a check box 1405. Furthermore, the user designates, via a check box 1406, which of a manual duplex printing, by which the user manually reverses the side of a print paper, and an auto duplex printing, by which a print paper sheet is reversed by a reversing mechanism, is to be performed.

When the user has completed the changing of various settings for the print processing, the user presses an OK button 1407 or an "apply" button 1408.

Here, an OS used in the present exemplary embodiment has a function for storing one combination of desired settings as a default setting (hereinafter simply referred to as a "system default") for each printing system (for example, a PC), not for each user account. Meanwhile, print setting information that application software acquires from a printer driver is set as a system default if the user has never stored the setting for the user default unique to his user account.

Accordingly, in the case where no user has customized the user default setting after the printer driver is installed, the non-customized user default setting is applied to all users utilizing the computer. This setting is useful in a method for allowing a plurality of users to use the same setting. Meanwhile, in the case where a user has at least once customized the user default and stored the customized user default, the print setting information that the application acquires is used as the user default with respect to the user account.

In a paragraph "Introduction to Point and Print" of a document "Windows Driver Kit (WDK) Documentation" attached to Windows Driver Development Kit of Microsoft Corporation, a "Point and Print" system, which is a print network-connected system, is described.

In such system, in the case where a default setting for each printing system is stored on a print server computer, the stored default setting is stored as the default setting for each printing system also on a client computer.

In this case also, if no user of a client computer has stored the unique user default, then the system default is used as default print setting information. In changing the system default, a setting UI window similar to that illustrated in FIG. 15 is displayed based on predetermined processing by the OS for performing a system default setting and the user performs a change via the setting UI window.

First Exemplary Embodiment

Figure 1:
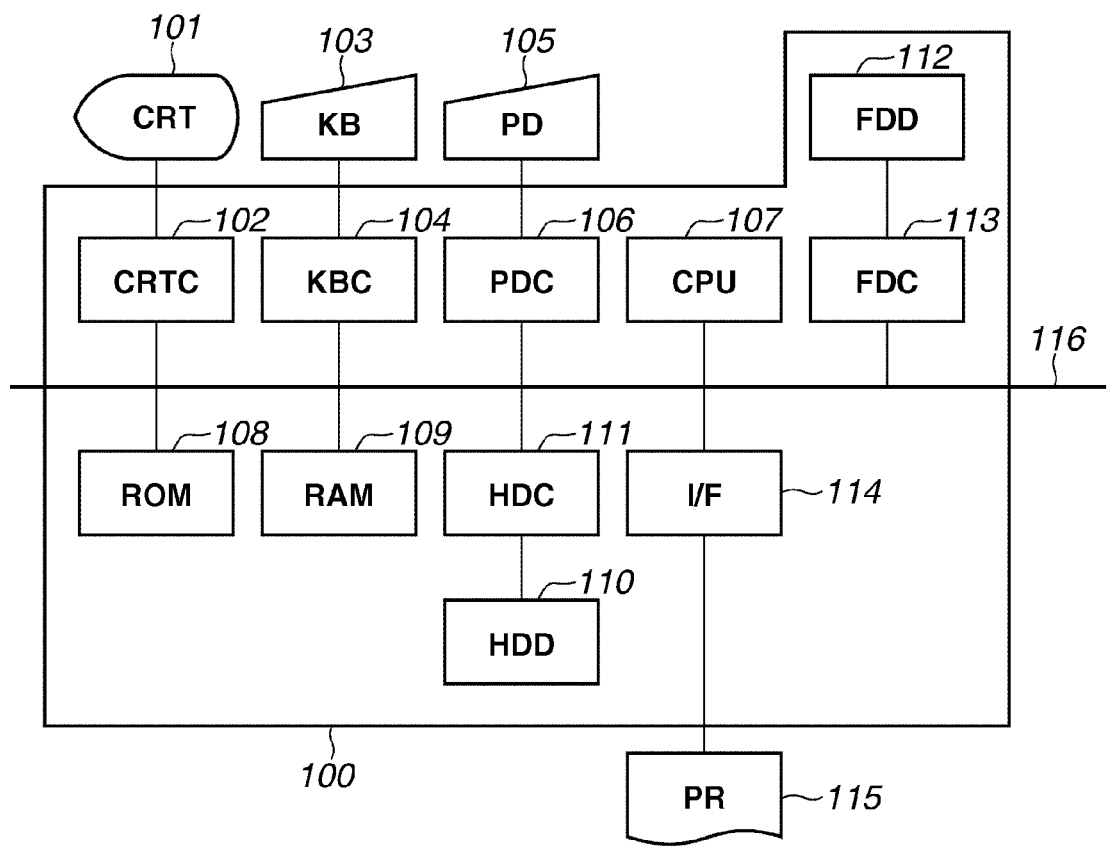
FIG. 1 illustrates an example of a hardware configuration of a printing system to which an information processing apparatus according to a first exemplary embodiment of the present invention can be applied.

A first exemplary embodiment of the present invention will be described below. FIG. 1 illustrates an example of a hardware configuration of a printing system to which the information processing apparatus according to the first exemplary embodiment can be applied. In the present exemplary embodiment, a host computer 100, which includes the following hardware resources, can communicate with a printer 115.

Referring to FIG. 1, a cathode ray tube (CRT) display device 101 displays a print setting dialog and printer status information provided by a printer driver. A liquid crystal display (LCD) can be used for the display device 101, instead of using a CRT.

A CRT controller (CRTC) 102 is a controller for the CRT display device 101 and controls a display on the CRT display device 101. A data input device (KB) 103, such as a keyboard, is controlled by a KB controller (KBC) 104.

A coordinate input device (PD) 105, such as a pointing device, is controlled by a PD controller (PDC) 106.

A central processing unit (CPU) 107 controls the entire operation of each device connected thereto via a bus 116. A read-only memory (ROM) 108 stores a boot program.

A random access memory (RAM) 109 stores the OS, each application program, and a printer driver program. The RAM 109 is used as a work area for the CPU 107.

A hard disk drive (HDD) 110 stores the OS, each application program, a printer driver program, and font data. Furthermore, the HDD 110 temporarily stores a spool file. A hard disk controller (HDC) 111 controls an access for writing and reading data on and from the HDD 110. Further, the HDD 110 ensures an area for storing the print setting information referred to by the printer driver that will be described in detail below.

The print setting information, in which a setting value is set for each of a plurality of setting items, is stored on the HDD 110. Furthermore, the HDD 110, functions as a default setting information storage unit that stores default setting information having different attributes for the present exemplary embodiment and each of the following exemplary embodiments, which will be described in detail below.

A floppy disc drive (FDD) 112 is a portable storage medium drive. A floppy disc controller (FDC) 113 controls an access for writing and reading data on and from the FDD 112.

An interface (I/F) 114 is connected to the printer (PR) 115, such as an inkjet printer, via an I/F cable. The HDD 110 is installed with a printer driver corresponding to the PR 115.

In the printing system having the above-described configuration, when the host computer 100 is powered on, the CPU 107 is activated according to the boot program stored on the ROM 108, then loads the OS from the HDD 110, and then waits for a user operation.

When the CPU 107 receives a print instruction or an instruction for changing a print setting in the printer driver via the application, by a user operation of the KB 103 or the PD 105, the CPU 107 loads the printer driver stored on the HDD 110 on the RAM 109 to activate the printer driver. The setting can be such that the printer driver stored on the HDD 110 is loaded on the RAM 109 to be automatically activated.

Figure 2:
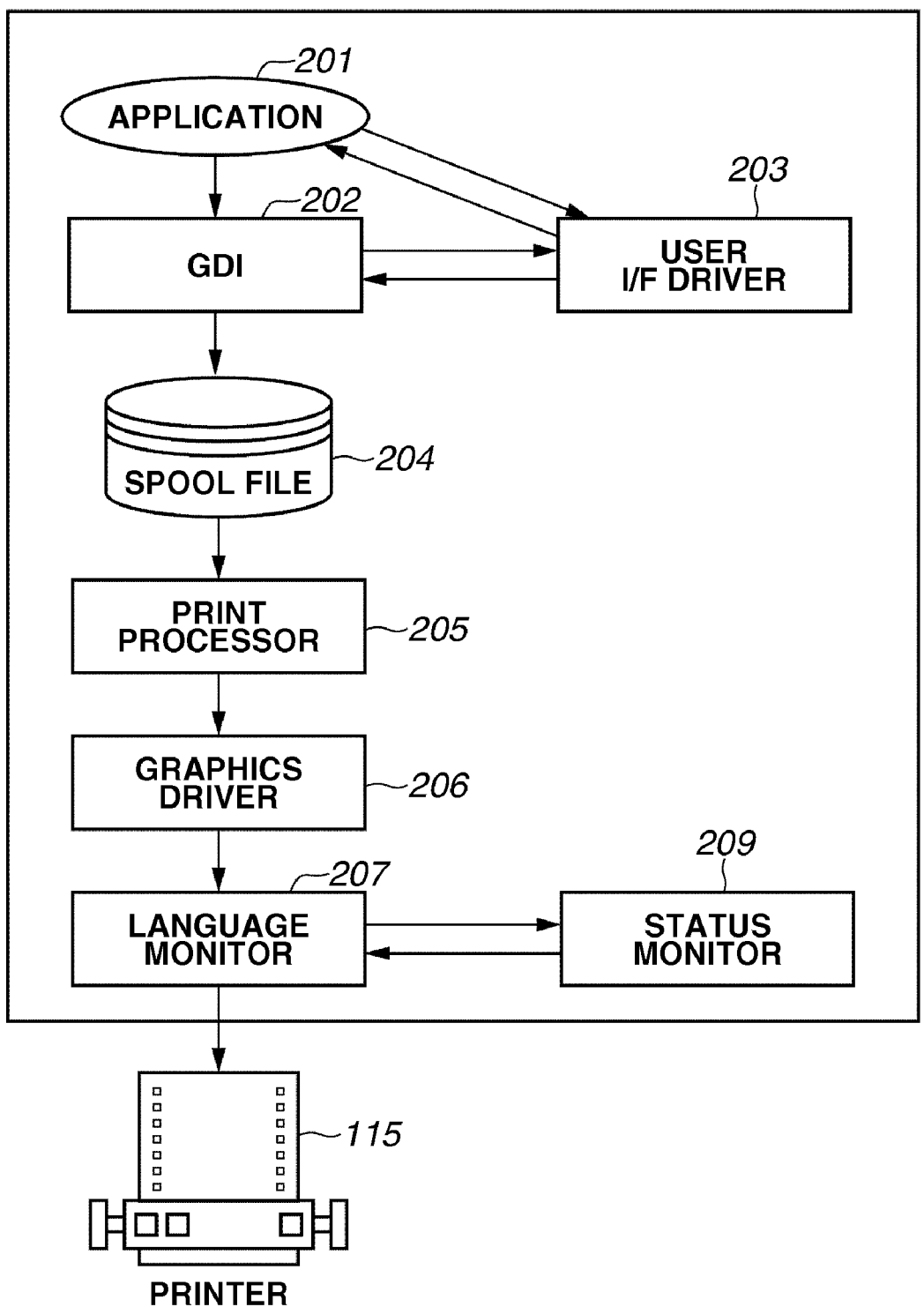
FIG. 2 illustrates an example of a module configuration of software of the printing system illustrated in FIG. 1 according to the first exemplary embodiment of the present invention.

FIG. 2 illustrates an example of a module configuration of software (basically, the printer driver) of the printing system illustrated in FIG. 1 according to the present exemplary embodiment. In the description as to the example in FIG. 2, components that are similar to those illustrated with reference to FIG. 1 are provided with the same numerals and symbols. Each module according to the present exemplary embodiment exists within the host computer 100.

Referring to FIG. 2, program modules of the printing system are previously stored on the HDD 110 (FIG. 1) while a spool file 204 is not. A necessary program is loaded on the RAM 109 at the time of printing or changing the print setting. The spool file 204 is generally generated on the HDD 110 at the time of printing.

An application 201 generates a document. Then, the application 201 inquires of a user I/F driver 203 a function of the printing system, and then notifies the printing system including a graphic device interface (GDI) 202 of the OS of a start of printing. When the GDI 202 receives the notification of the start of printing from the application 201, the GDI 202 notifies a print event for starting printing by the application 201 to the user I/F driver 203.

Then, the application 201 sends print data of the document to be printed to the GDI 202 and continues the print processing. The print data sent to the GDI 202 is then stored in the spool file 204.

A print processor 205 reads print data from the spool file 204 and sends the read print data to a language monitor 207 via a graphics driver 206. The language monitor 207 sends the print data to the PR 115 while performing a bidirectional communication with the PR 115.

The language monitor 207, as necessary, receives status information stored on the PR 115. Furthermore, based on the information received from the PR 115 and the print data to be sent, the language monitor 207 notifies the current status of the PR 115 and the current progress status of print processing to a status monitor 209. The status monitor 209 displays the received current status of the PR 115 and current progress status of print processing.

The status monitor 209 not only displays the status of the PR 115 or the print processing but, when print processing has been suspended due to a specific cause, also notifies a user of alternatives to be taken, receives an instruction input by the user, and sends the instruction to the language monitor 207.

Figure 3:
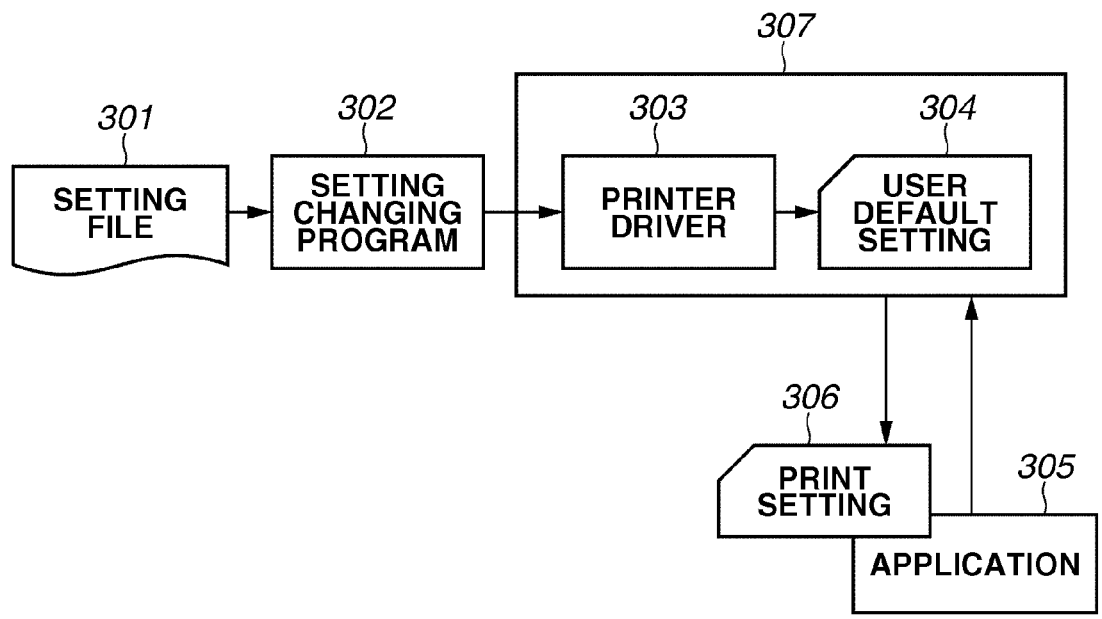
FIG. 3 illustrates an example of processing for changing a print setting performed by the information processing apparatus according to the first exemplary embodiment of the present invention.

FIG. 3 illustrates an example of processing for changing a print setting performed by the information processing apparatus according to the present exemplary embodiment. The example illustrated in FIG. 3 describes processing for changing a user default setting of a logon user. All components illustrated in FIG. 3 are stored on the HDD 110 (FIG. 1) and are loaded on the RAM 109 as necessary.

Referring to FIG. 3, a setting file 301 is previously generated by a user using a text editor. The setting file 301 includes content of a print setting to be changed, for example. An example of content of the setting file 301 will be described with reference to FIG. 4. A setting changing program 302, when the setting file 301 is acquired, generates an instruction for changing the print setting information stored on the HDD 110 and referred to by a printer driver 303.

Figure 4:
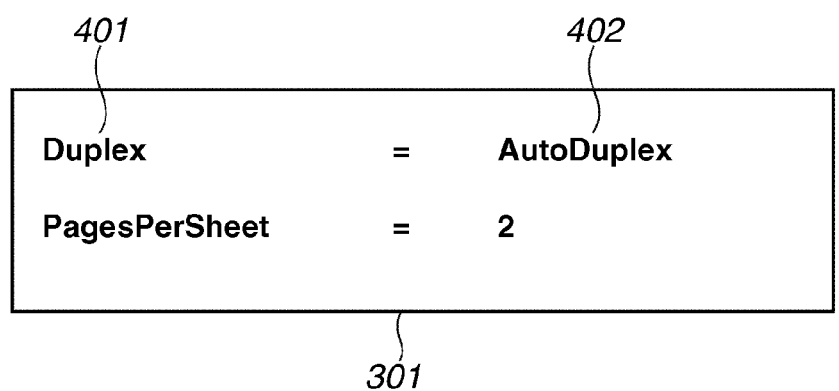
FIG. 4 illustrates an example of content of a setting file illustrated in FIG. 3 according to the first exemplary embodiment of the present invention.

FIG. 4 illustrates an example of content of the setting file 301 (FIG. 3) according to the present exemplary embodiment.

Referring to FIG. 4, the setting file 301 includes a setting item 401 to be changed and a setting value 402 for the setting item 401, which is to be set by the change. The setting file 301 includes a setting item or items to be changed only. In the example in FIG. 4, the setting file 301 includes an instruction for designating an auto duplex printing and printing two pages on one paper sheet, as the content of change in the setting items 401. That is, in the example in FIG. 4, it is assumed that setting items other than the setting items 401 in the setting file 301 are not to be changed.

Referring back to FIG. 3, the setting changing program 302 generates an instruction for applying the content of the setting file 301 to the user default using the printing system according to the present exemplary embodiment.

The printer driver 303 includes a changing function unit for changing print setting information. The printer driver 303 operates under the management by an OS 307. Processing performed by the changing function unit for changing print setting information will be described in more detail later below with reference to FIG. 5.

A user default setting 304 is provided for an account of a user currently logged in the printing system (FIG. 1). The user default setting 304 is stored in a storage area of a non-volatile memory managed by the OS 307.

When the user inputs the setting file 301 into the setting changing program 302, the setting changing program 302 performs the following process.

The setting changing program 302 performs processing for changing print setting information by designating, for a default setting changing unit provided by the printer driver 303, information for identifying a user default setting, which is a change target, and the setting file 301, which includes content of the change.

In the present exemplary embodiment, the printer driver 303 of the information processing apparatus externally provides a default setting changing unit as a program function. The information for identifying a user default setting and the setting file 301 are functional arguments passed to the program function.

When the printer driver 303 is instructed by the OS 307 to change a user default setting based on the setting file 301, the printer driver 303 applies each setting in the setting file 301 to the user default setting 304 and thus updates the user default setting 304. The item updated here is the item described in the setting file 301 only.

Figure 5:
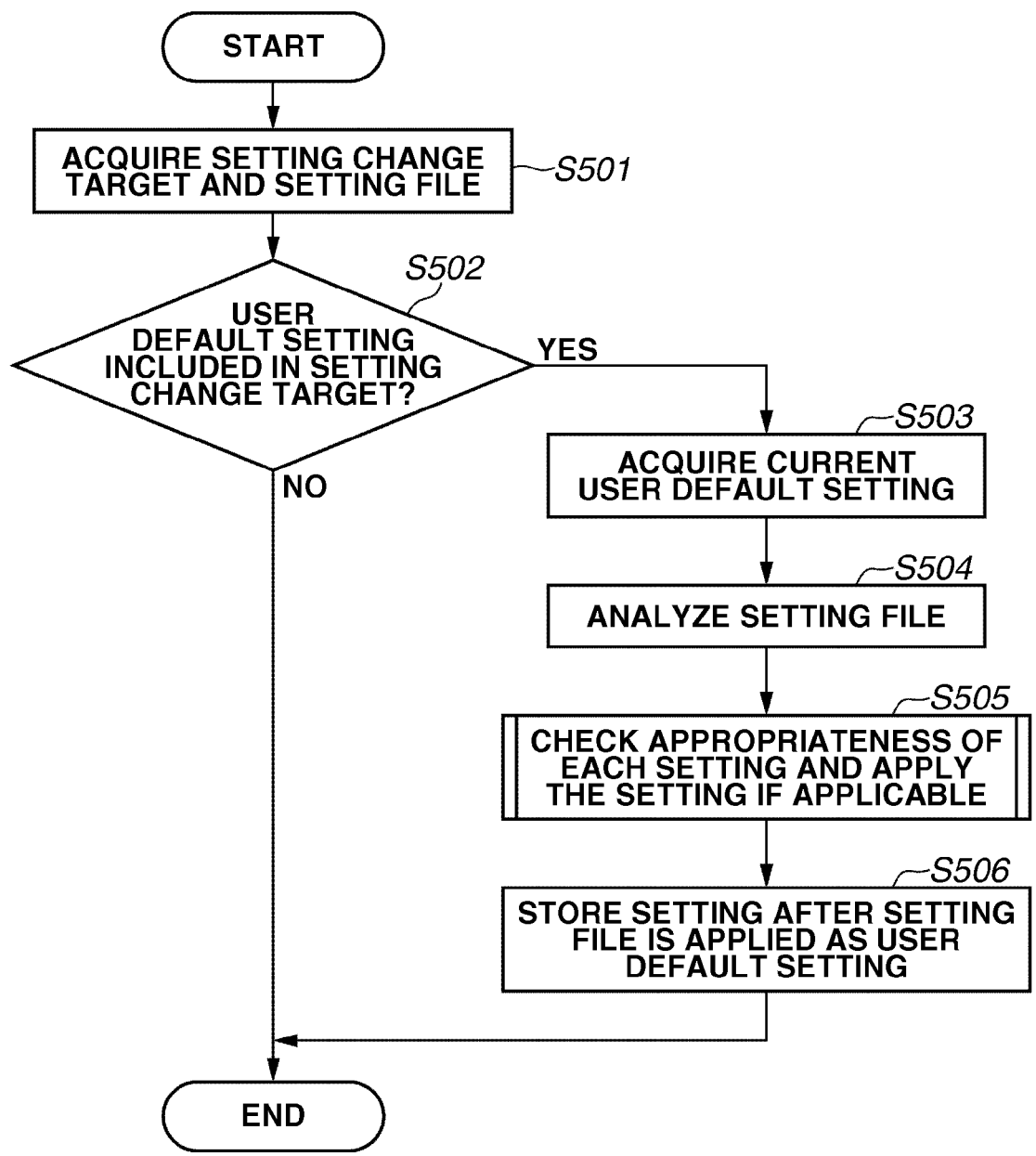
FIG. 5 is a flow chart illustrating an example of data processing performed by the information processing apparatus according to the first exemplary embodiment of the present invention.

FIG. 5 is a flow chart illustrating an example of data processing performed by the information processing apparatus according to the present exemplary embodiment. The exemplary processing illustrated in FIG. 5 is processing for changing the print setting information performed by the printer driver 303. Each step of the processing is executed according to a program that the CPU 107 loads from the HDD 110 on the RAM 109.

Referring to FIG. 5, in step S501, the printer driver 303 acquires a change target and the setting file 301, which is the change content, via the setting changing program 302. The setting changing program 302 generates a specific instruction to the printer driver 303 to change the print setting information managed by the printer driver 303. For example, the setting changing program 302 analyzes the setting value 402 for the setting item 401, which has been set in the setting file 301, and generates to the printer driver 303 a command for changing the content of the print setting information managed by the printer driver 303 and a parameter therefor.

In step S502, the printer driver 303 determines whether the change target includes a user default setting. If it is determined in step S502 that the change target does not include the user default setting 304 (NO in step S502), then the process ends. On the other hand, if it is determined in step S502 that the change target includes the user default setting 304 (YES in step S502), then the process advances to step S503.

In step S503, the printer driver 303 acquires the current user default setting 304. In step S504, the printer driver 303 analyzes the setting item in the setting file 301.

In step S505, the printer driver 303 determines whether each setting item in the setting file 301 can be applied to the user default setting 304 acquired in step S503. If a setting item in the setting file 301 can be applied to the user default setting 304 acquired in step S503, the printer driver 303 applies the applicable setting item to the user default setting 304 acquired in step S503. On the other hand, if the setting item in the setting file 301 cannot be applied to the user default setting acquired in step S503, the printer driver 303 appropriately corrects the setting (including the other setting items) and applies the change to the change target. The correction method, and whether the setting item in the setting file 301 can be applied, are determined according to device characteristics.

More specifically, in the case where photographic high-grade paper, which is not suitable for use in duplex printing, has previously been set as the paper type in the user default setting and auto duplex printing has been set in the setting file 301, the printer driver 303 preferentially uses the setting for the paper type and invalidates the designation for auto duplex printing.

Furthermore, in the case where a function that the PR 115 does not support has been described in the setting file 301, the printer driver 303 does not apply the setting.

As described above, the printer driver 303 applies the change to the user default setting 304 based on the acquired setting file 301. Then, in step S506, the printer driver 303 overwrites the user default setting with the setting after change and stores the changed user default setting. Then, the processing ends.

Now, referring back to FIG. 3, the data processing by the printing system (FIG. 1) will be described. In the present exemplary embodiment, it is assumed that the user who performs a printing operation according to the following process has already logged into the printing system by an account with which the user has performed the process for changing the user default setting 304 and that an application 305 (FIG. 3) operates under the login account.

The application 305 (FIG. 3) includes, for example, a word processor. In performing print processing with the PR 115 from the application 305, the application 305, first, acquires the current user default setting 304 via the OS 307. A print setting 306 the application 305 acquires at this time is, substantially, the user default setting 304 having been changed according to the above-described processing.

In the case where it has been previously designated by the user to print five copies of a print target, the application 305 changes the content of the acquired print setting 306 such that five copies of the print target are to be printed. The application 305 starts the printing based on the print setting 306, to which only the change in the number of prints has been applied.

Thus, the change based on the content of the setting file 301 is applied to the user default setting 304. Accordingly, five copies of a document having a "2-in-1" layout, with which two pages are printed on each paper sheet, are output in the auto duplex print mode.

According to the present exemplary embodiment, any authentic user can perform a setting such that print setting information that the user desires can be constantly applied. Furthermore, according to the present exemplary embodiment, the user can perform a setting without referring to a printer driver setting UI and designate only an item to be changed by a setting file having a simple form, as described above. Accordingly, the user can complete a print setting changing operation in a relatively short time with a simple operation.

Second Exemplary Embodiment

Figure 6:
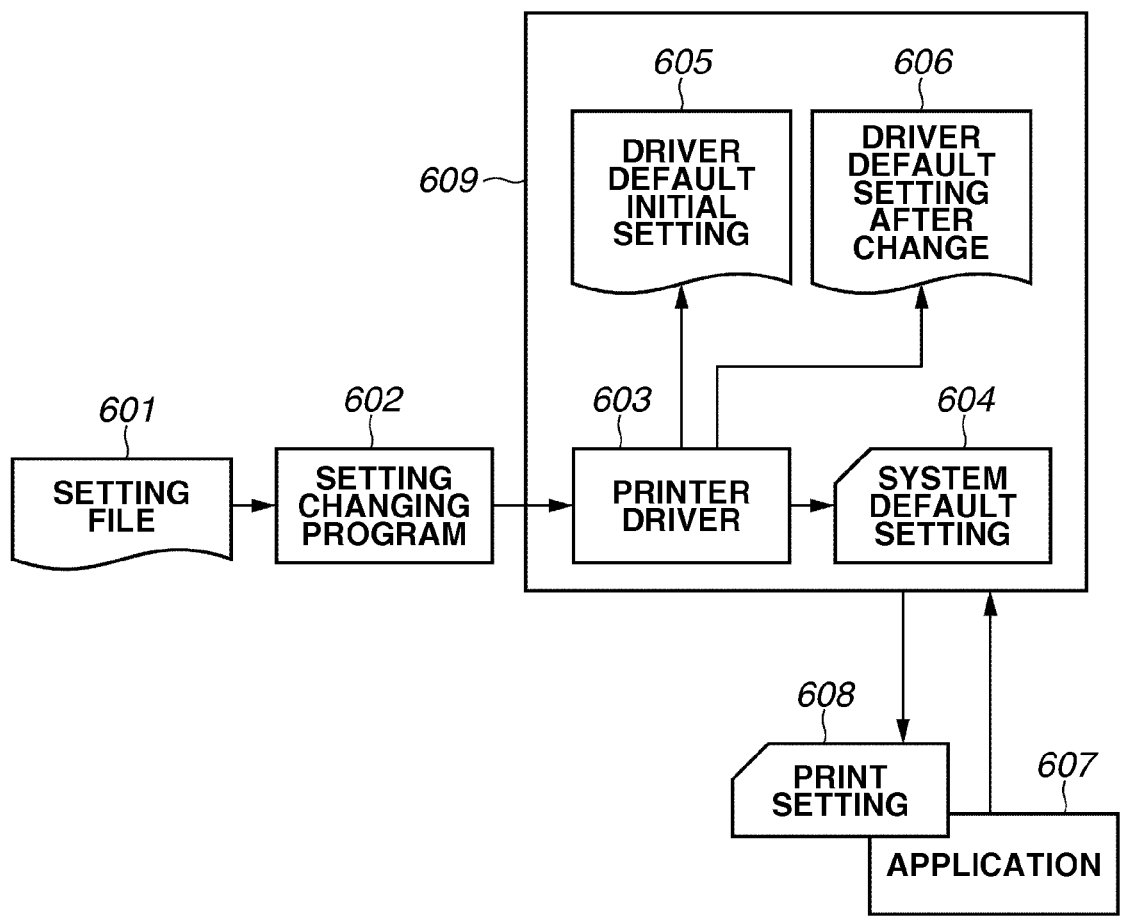
FIG. 6 illustrates an example of processing for changing a print setting performed by an information processing apparatus according to a second exemplary embodiment of the present invention.

A second exemplary embodiment of the present invention will be described below. FIG. 6 illustrates an example of processing for changing a print setting performed by an information processing apparatus according to the present exemplary embodiment. The exemplary processing illustrated in FIG. 6 is a process for changing a default setting applied to all users in the printing system (FIG. 1). The following file, program, and various settings are previously stored on the HDD 110 (FIG. 1), and are loaded on the RAM 109 as necessary.

Referring to FIG. 6, a setting file 601 has the same content as that of the setting file 301 (the setting item 401 and the setting value 402 in FIG. 4). The setting file 601 is useful in the case where a system administrator compulsorily applies the setting file 601 to all users who desire to perform print processing for resources saving. In such a case, it is more useful that the system default and the driver default have the same setting content.

A setting changing program 602 generates an instruction for applying the content of the setting file 601 to one or more user defaults instructed by the user, using the printing system according to the present exemplary embodiment.

A printer driver 603 includes each functional process according to the present exemplary embodiment. The printer driver 603 operates under the management by an OS 609. A system default setting 604 is provided for the printing system according to the present exemplary embodiment. The system default setting 604 is stored in a storage area of a non-volatile memory managed by the OS 609.

A driver default initial setting 605 is set for the printer driver 603. The driver default initial setting 605 is stored in a storage area of a non-volatile memory managed by the OS 609. A driver default setting after change 606 is obtained by changing the driver default initial setting 605 with the printer driver 603.

As described above, the present exemplary embodiment stores two different settings, namely, the driver default initial setting 605 and the driver default setting after change 606, as the driver default setting. The driver default initial setting 605 is included in default initial setting information and is stored on the HDD 110 functioning as a default initial setting information storage unit.

Here, the user inputs the setting file 601 to the setting changing program 602. Furthermore, the user inputs, to the setting changing program 602, the system default setting 604 and the driver default setting as targets of applying the setting.

Moreover, the setting changing program 602 performs processing for changing print setting information by designating, for a default setting changing unit provided by the printer driver 603, information for identifying the system default setting 604 and the driver default setting, each of which is a change target, and the setting file 601, which includes content of the change.

Then, the printer driver 603 applies each setting in the setting file 601 to the system default setting 604 and the driver default initial setting 605 to update the system default setting 604 and the driver default initial setting 605.

A flow of processing performed by the printer driver 603 will be described below with reference to FIGS. 7A and 7B.

Figure 7A:
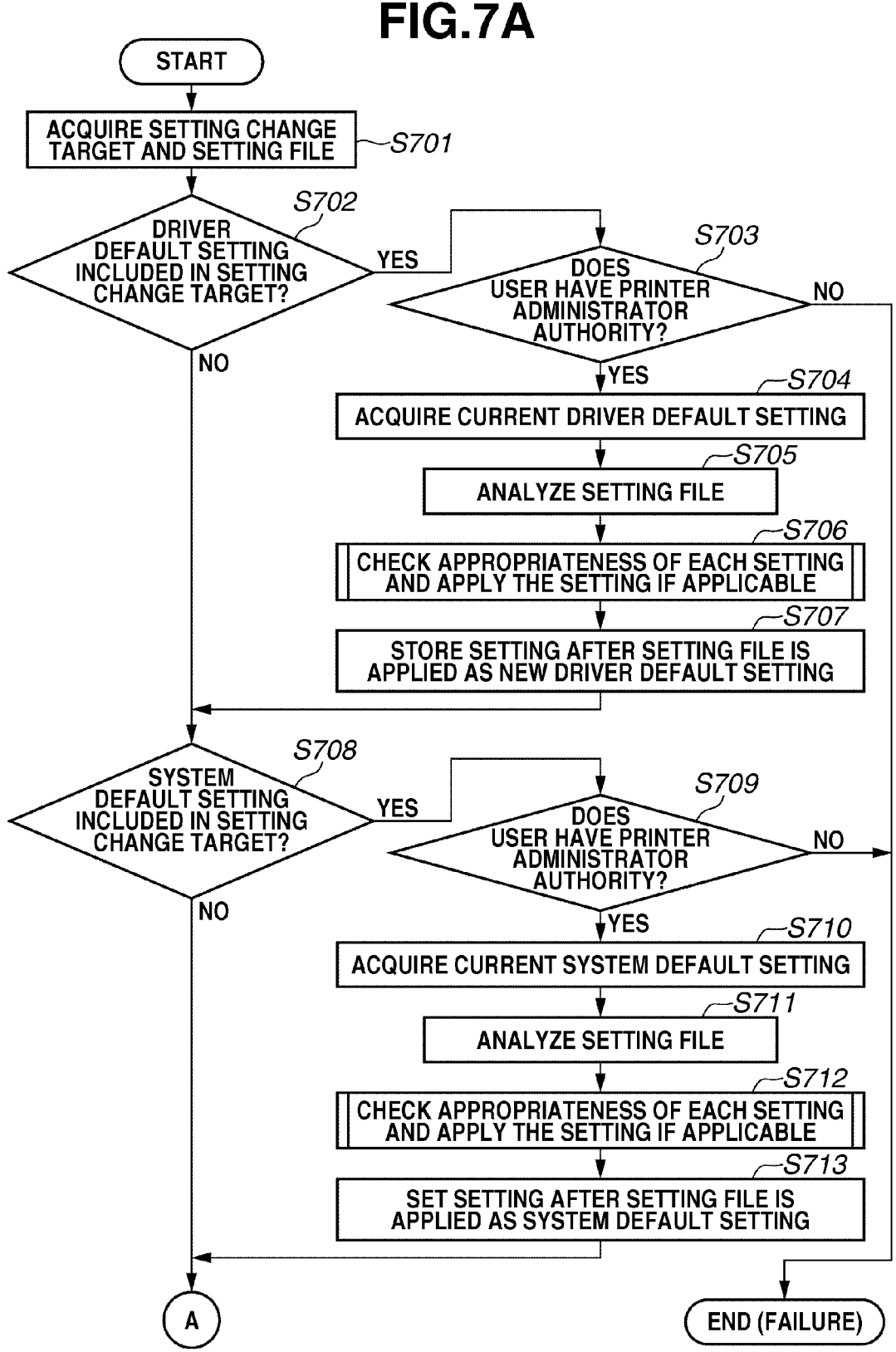
FIG. 7A is a flow chart illustrating an example of data processing performed by the information processing apparatus according to the second exemplary embodiment of the present invention.

Each of FIGS. 7A and 7B is a flow chart illustrating an example of data processing performed by the information processing apparatus according to the present exemplary embodiment. The exemplary processing illustrated in FIGS. 7A and 7B is processing for changing the print setting performed by the printer driver 603 (FIG. 6). Each step of the processing is executed according to a program that the CPU 107 loads from the HDD 110 on the RAM 109.

Referring to FIG. 7A, in step S701, the printer driver 603 acquires a change target and the setting file 601, which is the change content. In the case of changing the driver default or the system default, it is useful to restrict the authority to change the driver default or the system default to a user having a printer administrator authority. It is more useful that the OS 609 performs control to restrict the authority to change the driver default or the system default to an authentic printer administrator.

In step S702, the printer driver 603 determines whether the change target includes a driver default setting. If it is determined in step S702 that the change target does not include a driver default setting (NO in step S702), then the process advances to step S708. On the other hand, if it is determined in step S702 that the change target includes a driver default setting (YES in step S702), then the process advances to step S703.

In step S703, the printer driver 603 determines whether the user who is currently logged into the printing system under the present account has authority as a printer administrator (that is, whether the user instruction is valid). If it is determined in step S703 that the user who is currently logged into the printing system under the present account and operates the printer driver 603 via the setting changing program 602 does not have authority as a printer administrator (NO in step S703), then the process ends. On the other hand, if it is determined in step S703 that the user who is currently logged into the printing system under the present account has authority as a printer administrator (YES in step S703), then the processing advances to step S704. In step S704, the printer driver 603 acquires the current driver default setting. Here, as described above, the initial setting and the setting after change are separately stored as the driver default initial setting 605 and the driver default setting after change 606, respectively.

More specifically, in step S704, if a setting that has been changed from the initial setting exists, then the printer driver 603 acquires the driver default setting after change 606. On the other hand, if no setting that has been changed from the initial setting exists, then the printer driver 603 acquires the driver default initial setting 605.

In step S705, the printer driver 603 analyzes the setting item in the setting file 601. In step S706, the printer driver 603 determines whether each setting item in the setting file 601 can be applied to the driver default setting acquired in step S704. If it is determined that a setting item in the setting file 601 can be applied to the driver default setting acquired in step S704, the printer driver 603 applies the applicable setting item to the driver default setting acquired in step S704. On the other hand, if it is determined that the setting item in the setting file 601 cannot be applied to the driver default setting acquired in step S704, the printer driver 603 appropriately corrects the setting (including the other setting items) and applies the change to the change target. As in the case of the first exemplary embodiment, the correction method, and whether the setting item in the setting file 601 can be applied, are determined according to device characteristics.

As described above, the printer driver 603 applies the change to the acquired driver default setting. Then, in step S707, the printer driver 603 stores the changed setting as the driver default setting after change. If the driver default setting after change already exists, then the printer driver 603 overwrites the acquired driver default setting. Then, the process advances to step S708.

In step S708, the printer driver 603 determines whether the change target acquired in step S701 includes a system default setting. If it is determined in step S708 that the change target acquired in step S701 does not include any system default setting (NO in step S708), then the processing advances to step S714 (FIG. 7B). On the other hand, if it is determined in step S708 that the change target acquired in step S701 includes a system default setting (YES in step S708), then the processing advances to step S709 (FIG. 7A).

In step S709, the printer driver 603 determines whether the user who is currently logged into the printing system under the present account has authority as a printer administrator (that is, whether the user instruction is valid). If it is determined in step S709 that the user who is currently logged into the printing system under the present account and operates the printer driver 603 via the setting changing program 602 does not have authority as a printer administrator (NO in step S709), then the process ends. On the other hand, if it is determined in step S709 that the user who is currently logged into the printing system under the present account and operates the printer driver 603 via the setting changing program 602 has authority as a printer administrator (YES in step S709), then the process advances to step S710.

In step S710, the printer driver 603 acquires the current system default setting. In step S711, the printer driver 603 analyzes the setting item in the acquired setting file 601. In step S712, the printer driver 603 determines whether each setting item in the setting file 601 can be applied to the system default setting acquired in step S710. If it is determined that a setting item in the setting file 601 can be applied to the system default setting acquired in step S710, the printer driver 603 applies the applicable setting item to the system default setting acquired in step S710. On the other hand, if it is determined that the setting item in the setting file 601 cannot be applied to the system default setting acquired in step S710, the printer driver 603 appropriately corrects the setting (including the other setting items) and applies the change to the change target. As in the case of the first exemplary embodiment, the correction method, and whether the setting item in the setting file 601 can be applied are determined according to device characteristics.

More specifically, in the case where photographic high-grade paper, which is not suitable for use in duplex printing, has previously been set as the paper type in the system default setting 604 and auto duplex printing has been set in the setting file 601, the printer driver 603 preferentially uses the setting for the paper type and invalidates the designation for the auto duplex printing.

Furthermore, in the case where a function that the PR 115 does not support has been described in the setting file 601, the printer driver 603 does not apply the setting.

As described above, the printer driver 603 applies the change to the acquired system default setting. Then, in step S713, the printer driver 603 overwrites the system default setting with the setting after change and stores the changed system default setting. Then, the process advances to step S714 (FIG. 7B).

In addition, the printer driver 603 can perform setting changing processing including the user default setting by performing the processing in steps S714 through S718 (FIG. 7B) each corresponding to steps S502 through S506 (FIG. 5 in the first exemplary embodiment), although it is not required to change the user default setting in the present exemplary embodiment. If the printer driver 603 changes the user default setting here, the system default setting becomes invalid for the current user account.

Returning to FIG. 6, the process to be performed thereafter will be described. The following process can be performed not only by the user who (user account that) performed the above-described processing but also by an arbitrary user who (user account that) can use the PR 115 via a printing system (computer) having the system default setting changed by the above-described process.

Furthermore, it is assumed in the present exemplary embodiment for the following process that each user has never stored a unique user default setting after the installation of the printer driver and thus the system default setting is preferentially applied.

In FIG. 6, an application 607 includes, for example, a word processor. In performing print processing with the PR 115 from the application 607, the application 607, first, acquires a current user default setting via the OS 609. However, in the case where no user default setting exists, a print setting 608 the application 607 acquires is, substantially, the system default setting 604 having been changed according to the above-described process.

In the case where it has been previously designated by the user to print five copies of a print target, the application 607 changes content of the acquired print setting 608 such that five copies of the print target are to be printed. The application 607 starts the printing based on the print setting 608, to which only the change in the number of prints has been applied. As a result, five copies of a document having a "2-in-1" layout, with which two pages are printed on each paper sheet, are output in the auto duplex print mode.

On the other hand, if the user has changed the user default setting by mistake after the installation of the printer driver on the printing system, or if the user has intentionally and temporarily changed the user default setting, then the application 607 substantially acquires the changed user default setting as the print setting 608.

In this case, the user can press a "reset setting" button, which is displayed on the driver UI that the printer driver 603 provides, to instantly change the user default setting to the same setting as the driver default setting. Accordingly, each user can change the content of the user default setting to the same content as that of the system default setting 604. Here, the "reset setting" button functions as a unit for generating an instruction for resetting the user default setting to the printer driver 603.

In the present exemplary embodiment, in steps S703 and S709, the printer driver 603 determines whether the instruction for changing the setting (each of the driver default setting and the system default setting) has been generated by a user having a printer administrator authority (whether the user instruction is valid). Accordingly, the present exemplary embodiment having the above-described configuration is particularly useful in a large-scale printing system including a large number of computers, each of which is used by a large number of print operators (users), in the case where the administrator of the printing system desires to apply a uniform setting different from the initial setting applied to the printing system at the time of its shipping.

In addition, the present exemplary embodiment having the above-described configuration does not require its administrator to perform a print setting for each of a large number of computers or operators. Furthermore, in the present exemplary embodiment, the print setting value includes only difference information. Accordingly, in the case where the administrator of the printing system has performed a unique setting for each computer and if the unique setting performed by the administrator is not included in the setting item to be uniformly set, then the unique setting can be used as it is.

Moreover, according to the present exemplary embodiment, the user can change the setting for the driver default setting. Thus, in the case where each user has generated a user default setting unique to the user by mistake or where each user has intentionally and temporarily generated or changed the user default setting, the user can easily reset the mistakenly set setting and restore the system default setting with a simple operation. That is, according to the present exemplary embodiment, the user does not reset the setting to its initial setting in this case but can restore the setting to the system default setting to be set to each computer. Thus, the print setting desired by the administrator of the printing system can be restored.

Third Exemplary Embodiment

Figure 8:
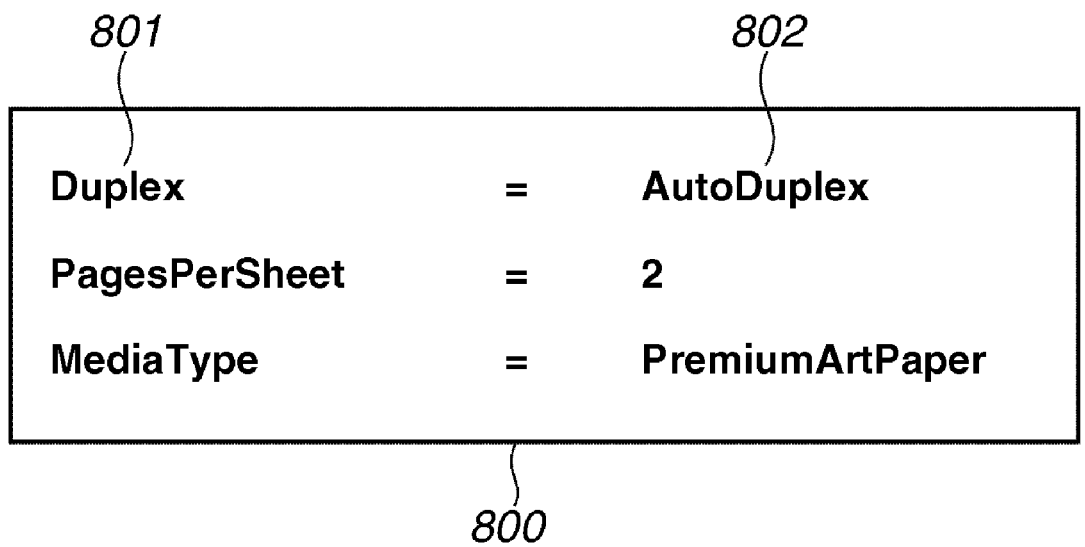
FIG. 8 illustrates an example of a setting file generated by an information processing apparatus according to a third exemplary embodiment of the present invention.

A third exemplary embodiment of the present invention will be described below. FIG. 8 illustrates an example of a setting file generated by an information processing apparatus according to the present exemplary embodiment. In the present exemplary embodiment, different "setting items" or "setting values", which can be changed under an authentic user's authority, are set for the printing system.

Referring to FIG. 8, a setting file 800 is previously generated by a user using a text editor as in the first exemplary embodiment. The setting file 800 includes a setting item 801 to be changed and a setting value 802 for the setting item 801, which is to be set by the change. The setting file 800 includes only the setting item to be changed.

In the example in FIG. 8, the setting file 800 includes an instruction for designating an auto duplex printing and printing two pages on one paper sheet, as the content of change in the setting item 801. Furthermore, in the present exemplary embodiment, it is designated by the user to use expensive dedicated art (coated) paper. Accordingly, in the present exemplary embodiment, the use of the dedicated art (coated) paper is restricted to a user having printer administrator authority.

That is, the present exemplary embodiment can be applied to a printing system that performs control to restrict the use of the dedicated art (coated) paper to a user having printer administrator authority.

Figure 9:
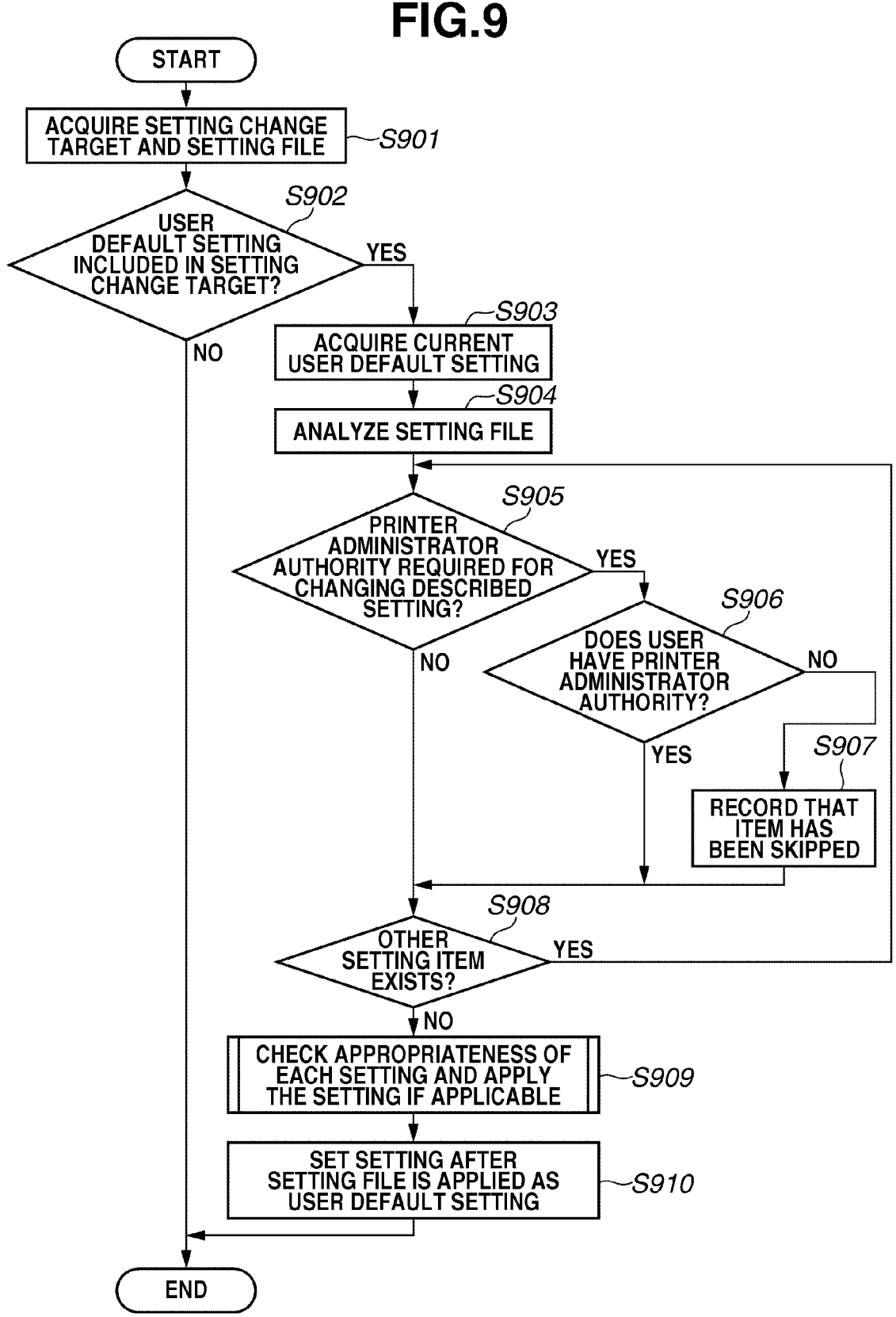
FIG. 9 is a flow chart illustrating an example of data processing performed by the information processing apparatus according to the third exemplary embodiment of the present invention.

FIG. 9 is a flow chart illustrating an example of data processing performed by an information processing apparatus according to the present exemplary embodiment. The exemplary process illustrated in FIG. 9 is processing for changing the print setting performed by the printer driver 303 (FIG. 1). Each step of the process is executed according to a program that the CPU 107 loads from the HDD 110 on the RAM 109. Processing in steps S901 through S904 is similar to that in steps S501 through S504 (FIG. 5) and processing in steps S909 and S910 is similar to that in steps S505 and S506 (FIG. 5). Accordingly, the description as to the process corresponding to that in FIG. 5 will not be repeated here.

Referring to FIG. 9, in step S905, the printer driver 303 determines whether the setting item designated by the user to be changed requires printer administrator authority. If it is determined in step S905 that the setting item designated by the user to be changed does not require printer administrator authority (NO in step S905), then the process advances to step S908. In step S908, the printer driver 303 determines whether another setting item exists.

If it is determined in step S908 that another setting item exists (YES in step S908), then the process returns to step S905. On the other hand, if it is determined in step S908 that no other setting item exists (NO in step S908), then the process advances to step S909.

On the other hand, if it is determined in step S905 that the setting item designated by the user to be changed requires printer administrator authority (YES in step S905), then the process advances to step S906. In step S906, the printer driver 303 determines whether the user changing the setting has printer administrator authority.

If it is determined in step S906 that the user changing the setting has the printer administrator authority (YES in step S906), then the process advances to step S908. On the other hand, if it is determined in step S906 that the user changing the setting does not have printer administrator authority (NO in step S906), then the process advances to step S907. In step S907, the printer driver 303 records the setting item as having been skipped and does not apply the skipped item to the user default setting, and then the process advances to step S908.

If it is determined in step S908 that process for all of the setting items included in the setting file has been completed (that no other unprocessed) setting item exists) (NO in step S908), then the printer driver 303 notifies information about the skipped setting item to the setting changing program 302.

The present exemplary embodiment having the above-described configuration is useful in the case where different authorities are required for different setting items. Furthermore, the setting item for which the user has no corresponding authority and thus has not been applied can be notified to the user performing the setting changing processing.

Fourth Exemplary Embodiment

A fourth exemplary embodiment of the present invention will be described below. In the present exemplary embodiment, it is assumed that different authorities are required for different print setting information items in the printing system. The present exemplary embodiment utilizes the control method according to the above-described third exemplary embodiment and in addition to this method, notifies the user of whether each setting can be applied, before applying all setting items designated by the user.

In the present exemplary embodiment, the printer driver 603 receives from the user an instruction for merely determining whether each setting item in the setting file 601 can be applied, instead of receiving an instruction for applying the designated change as in the printing system according to the second exemplary embodiment.

Figure 10:
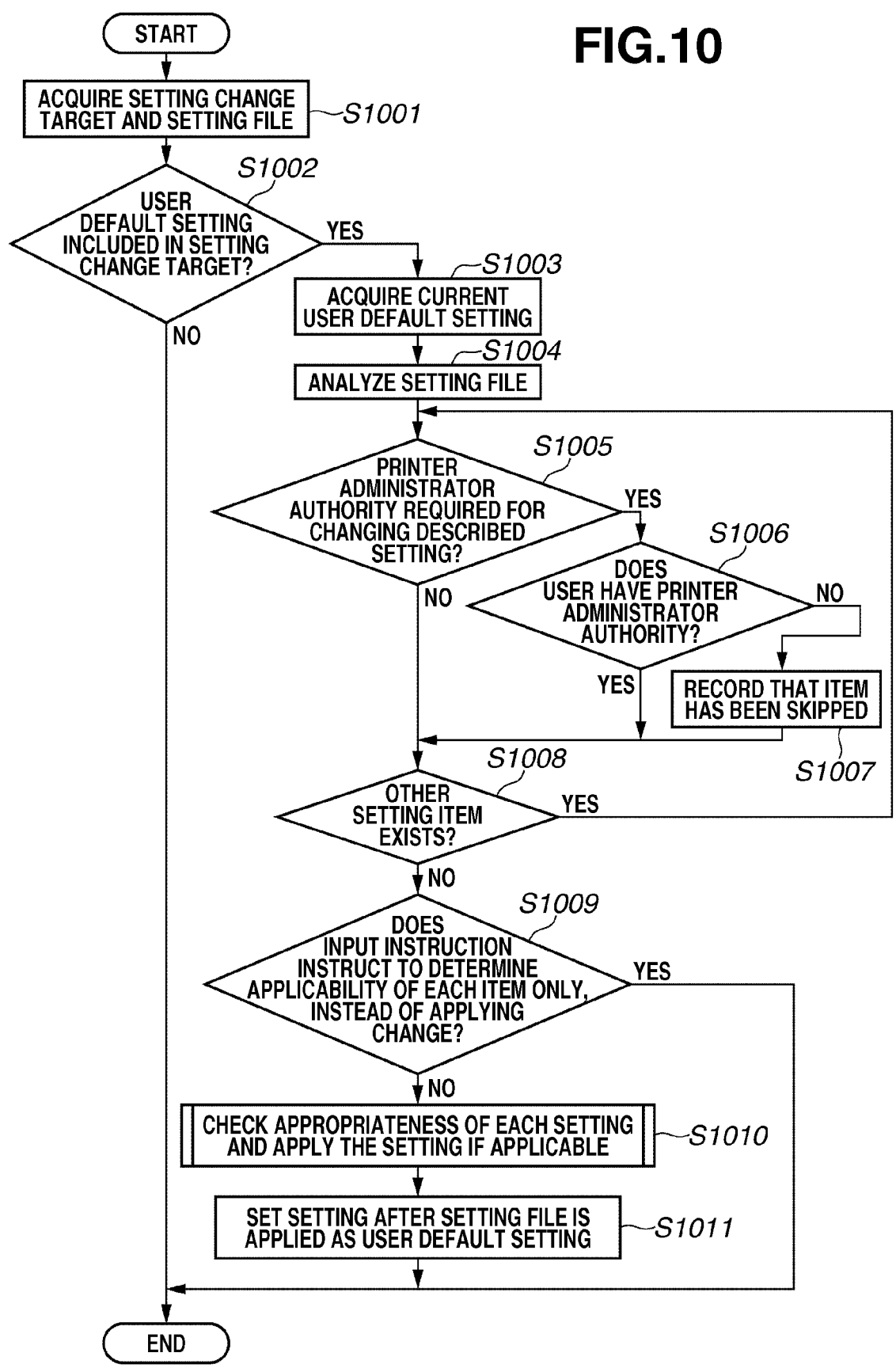
FIG. 10 is a flow chart illustrating an example of data processing performed by an information processing apparatus according to a fourth exemplary embodiment of the present invention.

FIG. 10 is a flow chart illustrating an example of data processing performed by an information processing apparatus according to the present exemplary embodiment. The exemplary processing illustrated in FIG. 10 is processing for changing the print setting performed by the printer driver 603 (FIG. 6). Each step of the process is executed according to a program that the CPU 107 loads from the HDD 110 on the RAM 109. Processing in steps S1001 through S1008 is similar to that in steps S901 through S908 (FIG. 9) and processing in steps S1010 and S1011 is similar to that in steps S909 and S910 (FIG. 9). Accordingly, the description as to the process corresponding to that in FIG. 9 will not be repeated here.

Referring to FIG. 10, in step S1009, the printer driver 603 determines whether the input user instruction is an instruction for merely determining whether each setting item in the setting file 601 can be applied, instead of receiving an instruction for applying the designated change. If it is determined in step S1009 that the input user instruction is an instruction for merely determining whether each setting item in the setting file 601 can be applied, instead of receiving an instruction for applying the designated change (YES in step S1009), then the printer driver 603 skips the processing in steps S1010 and S1011 and the process ends, even in the case where the user has the authority to change the content of the change target.

When the determination has been performed for all of the setting items, the printer driver 603 notifies the setting changing program 602 of information about the setting items that has been determined not applicable. At this time, the printer driver 603 can also notify the setting changing program 602 of information about the setting items that has been determined applicable.

The present exemplary embodiment having the above-described configuration is useful in the case where an indefinite and large number of users use a common setting file and where a setting file whose all setting items cannot be applied by all users cannot be prepared.

For example, in a printing system including a file server and a client computer, in the case where a setting file is downloaded from the file server to the client computer and the downloaded setting file is applied as the user default setting, the user can verify and evaluate content of the setting file before applying it.

Thus, according to the present exemplary embodiment, in the case where information about whether each setting item can be applied is not available (where a setting file to which each setting cannot surely be applied is used), the user who desires to change the change target can verify whether each item can be applied, before applying the desired change to the change target. Accordingly, the present exemplary embodiment can reduce or suppress the threat of a user performing print processing with a print setting that the user does not desire.

Fifth Exemplary Embodiment

A fifth exemplary embodiment of the present invention will be described. The present exemplary embodiment cancels the change once set to the user default setting performed by the method according to the first exemplary embodiment and resets the setting to (restores) the user default initial setting (the default initial setting set at the time of shipping of the printer driver), which will be described with reference to FIG. 11.

Figure 11:
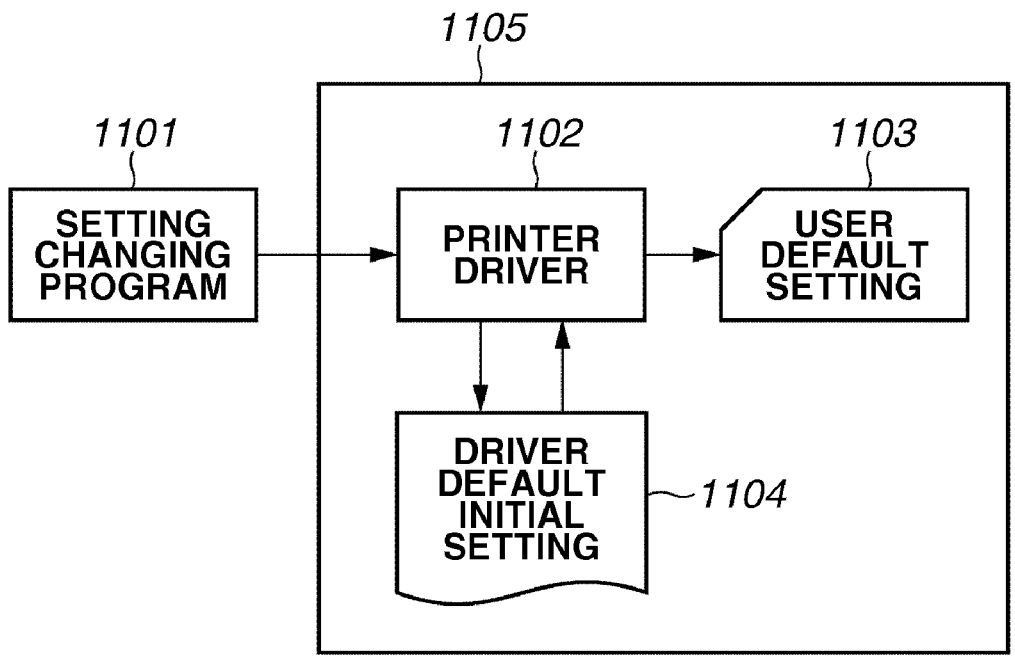
FIG. 11 illustrates an example of processing for changing a print setting performed by an information processing apparatus according to a fifth exemplary embodiment of the present invention.

FIG. 11 illustrates an example of processing for changing a print setting performed by an information processing apparatus according to the present exemplary embodiment.

Referring to FIG. 11, when the user inputs an instruction for canceling the set change to a setting changing program 1101, the setting changing program 1101 generates the following canceling instruction to a printer driver 1102. More specifically, the setting changing program 1101 generates an instruction for canceling the set change and sends information for identifying a user default setting, which is a change target, to a default setting changing unit provided by the printer driver 1102. In the example in FIG. 11, the printer driver 1102 operates under the management by an OS 1105. Furthermore, each of a user default setting 1103 and a driver default initial setting 1104 is stored in a storage area of a non-volatile memory managed by the OS 1105.

In the present exemplary embodiment, the printer driver 1102 of the information processing apparatus externally provides a default setting changing unit as a program function. The user default setting is a functional argument passed to the program function.

As described above, in the present exemplary embodiment, the printer driver 1102, which has been instructed to cancel the once-set change in the user default setting, loads the stored driver default initial setting 1104 and then overwrites the stored driver default initial setting 1104 with the stored user default setting 1103. The above-described processing is performed for canceling the once-set change in the user default setting. Similar control can be performed for canceling a once-set change in the system default setting.

With the above-described configuration, the present exemplary embodiment can cancel the change once set to the user default setting or the system default setting. The present exemplary embodiment is useful not only in the case where it is desired to simply restore the initial setting but also in the case where it is desired to temporarily restore the initial setting with the default setting changing unit before applying a desired change. Thus, the user can easily cancel the once-set change in the print setting and the administrator of the printing system is not required to perform a complicated operation to generate a setting file.

Sixth Exemplary Embodiment

Figure 12:
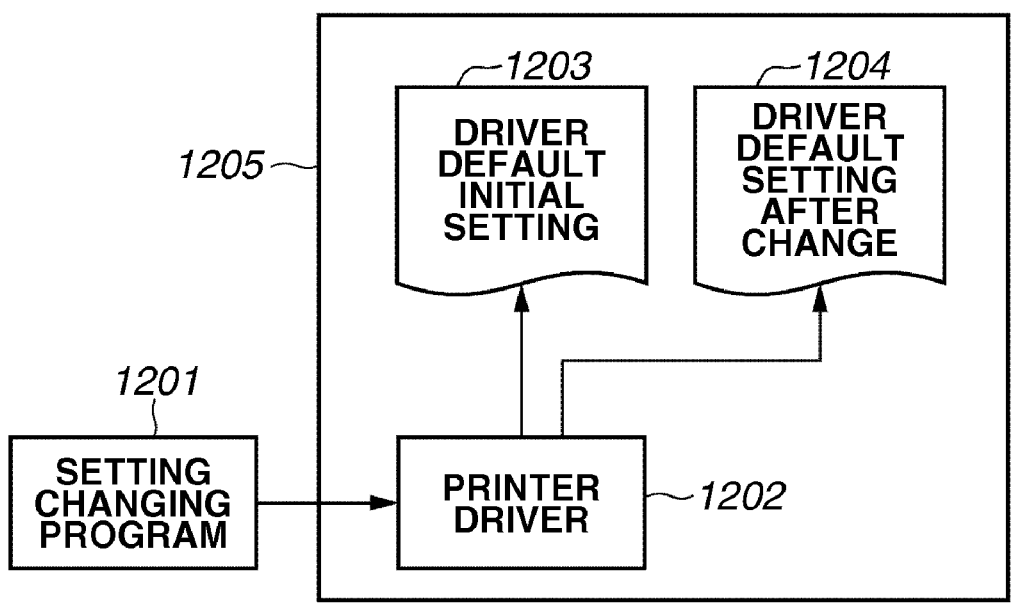
FIG. 12 illustrates an example of processing for changing a print setting performed by an information processing according to a sixth exemplary embodiment of the present invention.

A sixth exemplary embodiment of the present invention will be described below. FIG. 12 illustrates an example of processing for changing a print setting performed by an information processing apparatus according to the present exemplary embodiment. The present exemplary embodiment cancels the change applied to the driver default setting and restores the driver default setting to the setting applied at the time of shipment of the printer driver.

Referring to FIG. 12, a setting changing program 1201 generates an instruction for canceling the change applied to the driver default setting to a printer driver 1202.

Each of a driver default initial setting 1203, which is a setting before the desired change is applied, and a driver default setting after change 1204, which is a setting after the desired change has been applied, is stored in a storage area of a non-volatile memory managed by an OS 1205.

When the user inputs an instruction for canceling the set change to the setting changing program 1201, the setting changing program 1201 generates the following change canceling instruction to the printer driver 1202. More specifically, the setting changing program 1201 generates an instruction for canceling the applied change and sends information for identifying a driver default setting, which is a change target, to a default setting changing unit provided by the printer driver 1202.

In the present exemplary embodiment, the printer driver 1202 of the information processing apparatus externally provides a default setting changing unit as a program function. The driver default setting is a functional argument passed to the program function.

When it is instructed by the setting changing program 1201 to cancel the change applied to the driver default setting, the printer driver 1202 deletes the stored driver default setting after change 1204. Here, after the driver default setting is reset by the printer driver 1202, the driver default setting after change 1204 does not exist. Accordingly, the driver default setting is reset to the driver default initial setting 1203 (that is, the driver default initial setting 1203 is restored as the driver default setting).

With the above-described configuration, the present exemplary embodiment can cancel the change once set to the driver default setting. The present exemplary embodiment is useful not only in the case where it is desired to simply restore the initial setting but also in the case where the driver default setting is set at the same time as the system default setting as in the second exemplary embodiment. Thus, the present exemplary embodiment enables the shared use of the same setting file with a simple operation.

Seventh Exemplary Embodiment

A seventh exemplary embodiment of the present invention will be described below. In the present exemplary embodiment, a printer driver includes the function of the program for directly generating an instruction for applying a change to the printer driver, which is described above in the second exemplary embodiment. In the present exemplary embodiment, in the case where the printer driver including the setting file is installed as a package, the installation of the printer driver is completed in a state in which the contents of the settings are changed to those described in the setting file.

Figure 13:
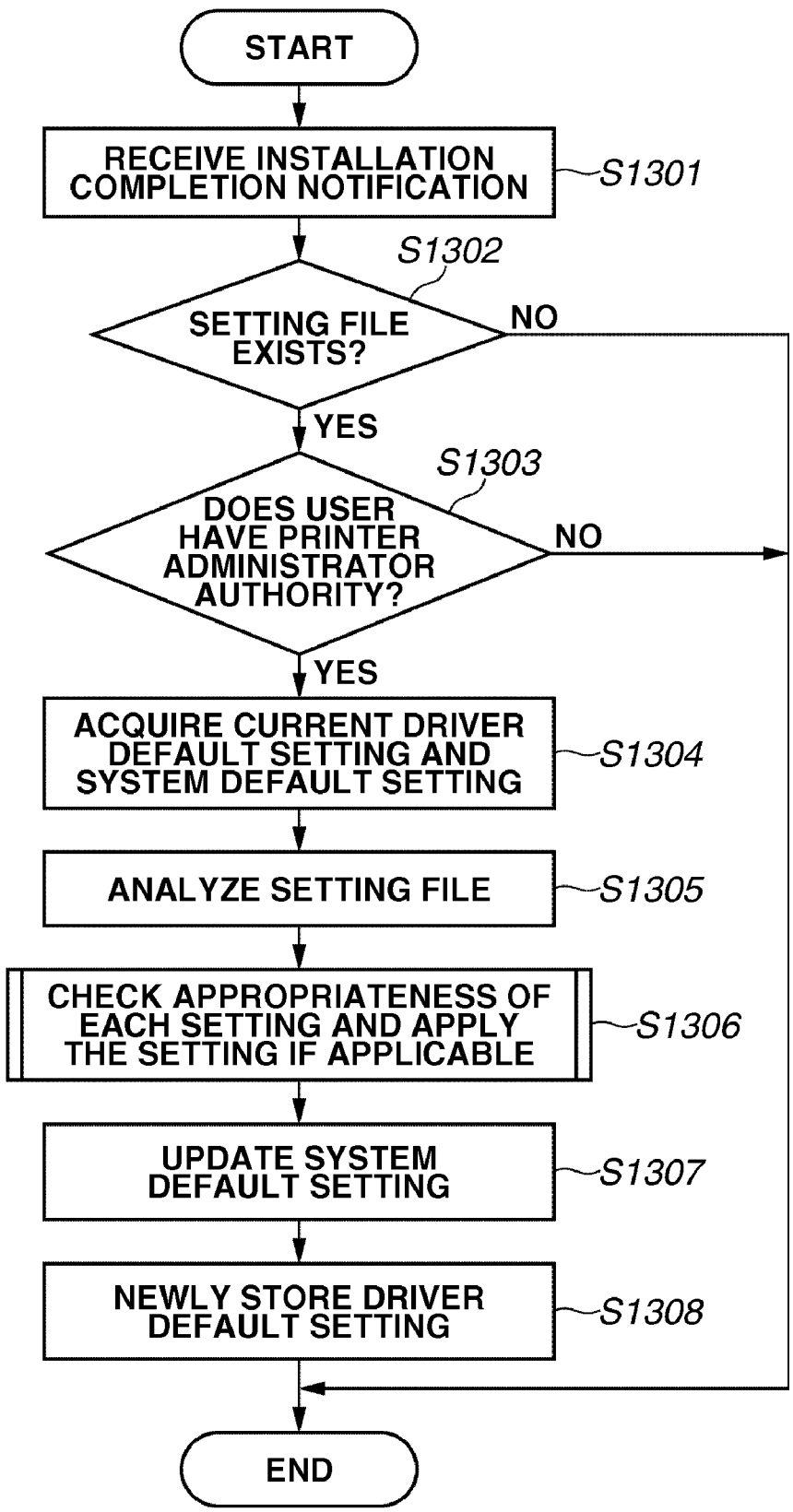
FIG. 13 is a flow chart illustrating an example of data processing performed by an information processing apparatus according to a seventh exemplary embodiment of the present invention.

FIG. 13 is a flow chart illustrating an example of data processing performed by an information processing apparatus according to the present exemplary embodiment. In the present exemplary embodiment, the printer performs the print setting changing process. More specifically, in the present exemplary embodiment, the printer driver, including a UI driver as one of its component, performs processing on the setting file, which includes a setting changing program as a package, at the time when the printer driver is installed.

Referring to FIG. 13, in step S1301, an OS notifies the completion of the installation of the printer driver as an event. In step S1302, the completely-installed printer driver determines whether a setting file exists in a specific location. The setting file can be included in an installation package or can be previously stored in a specific area of a storage medium of the computer.

If it is determined by the printer driver in step S1302 that no setting file exists (NO in step S1302), then the printer driver skips all processing for applying the desired change and the process ends. On the other hand, if it is determined by the printer driver in step S1302 that a setting file exists (YES in step S1302), then the processing advances to step S1303. In step S1303, the printer driver determines whether the user has a printer administrator authority required to apply the desired change to the system default setting and the driver default setting.

If it is determined in step S1303 that the user does not have the printer administrator authority required to apply the desired change to the system default setting and the driver default setting (NO in step S1303), then the printer driver skips all the processing for applying the desired change and the process ends. On the other hand, if it is determined in step S1303 that the user has the printer administrator authority required to apply the desired change to the system default setting and the driver default setting (YES in step S1303), then the process advances to step S1304. The determination in step S1304 can be omitted because the printer administrator authority is generally required for installing a printer driver.

In step S1304, the printer driver acquires the driver default setting and the system default setting. In step S1305, the printer driver reads and analyzes the setting file.

In step S1306, the printer driver checks each setting item in the setting file for appropriateness and determines whether each setting item can be applied to the system default setting and the driver default setting. If it is determined that each setting item can be applied to the system default setting and the driver default setting, the printer driver applies the applicable setting. On the other hand, if it is determined that each setting item cannot be applied to the system default setting and the driver default setting, then the printer driver appropriately corrects the setting (including the other setting items) and applies the change to the change target.

In step S1307, the printer driver overwrites the existing setting with the system default setting that has been changed by the above-described processing and stores the system default setting after change. In step S1308, the printer driver newly stores the driver default setting after change separately from the existing driver default setting, and then the process ends.

With the above-described configuration, the present exemplary embodiment can apply a desired change to the initial setting by determining whether a setting file exists after the installation of the printer driver. Thus, in an ordinary case where it is not necessary to customize each setting from its initial state, it is useful to provide the same printer driver to each of a plurality of computers in the printing system. To paraphrase this, the initial setting can be customized if a vendor of printers provides only the setting file as necessary or if the user generates and prepares a setting file and copies the setting file, which can be easily generated by the user, into the installation package.

Furthermore, according to the present exemplary embodiment having the above-described configuration, in a large-scale printing system including a larger number of computers, in the case where a printer driver whose setting has been customized is to be completely installed, the efficiency of installing the printer driver can be improved.

According to the above-described exemplary embodiments of the present invention, both an individual user who operates one computer and a corporate user using a large-scale system including a plurality of individual operators (users) can instantly and entirely change various default settings with a simple operation without referring to a driver setting UI in various cases.

Thus, according to the above-described exemplary embodiments of the present invention, the time and operation cost required for introducing a printing system can be greatly reduced. Furthermore, the time and operation cost required by a vendor of printers after the shipment for customizing a printing system can be reduced or become unnecessary because a system that can be customized before the shipment thereof can be provided.

Eighth Exemplary Embodiment

FIG. 14 illustrates a memory map of a storage medium that stores various data processing programs that can be read by an information processing apparatus according to an exemplary embodiment of the present invention.

Although not illustrated, information for managing the programs stored in the storage medium such as version information and information concerning the creator of a program, for example, can be stored in the storage medium. In addition, information that depends on an OS of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

Furthermore, the functions according to the above-described exemplary embodiments illustrated in FIGS. 5, 7A, 7B, 9, 10, and 13 can be implemented by a host computer using a program that is externally installed. In this case, the present invention is applied to the case where a group of information including a program is supplied to an output device from a storage medium, such as a compact disc-read only memory (CD-ROM), a flash memory, and a floppy disk (FD) or from an external storage medium via a network.

The present invention can also be achieved by providing a system or an apparatus with a storage medium storing program code of software implementing the functions of the embodiments and by reading and executing the program code stored in the storage medium with a computer of the system or the apparatus (a CPU) or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk, a magneto-optical disk (MO), a CD-ROM, a compact disc recordable (CD-R), a compact disc rewritable (CD-RW), a magnetic tape, a non-volatile memory card, a ROM, and a digital versatile disc (DVD (a DVD-read only memory (DVD-ROM) or a DVD-rewritable (DVD-RW)), for example, can be used.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (FTP) server for allowing a plurality of users to download the program file for implementing the functional processing configure the present invention.

In addition, the above program can also be supplied by distributing a storage medium, such as a CD-ROM and the like, which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-153710 filed Jun. 11, 2007, which is hereby incorporated by reference herein in its entirety.

What is claimed is:

1. An information processing apparatus having a printer driver corresponding to a printing apparatus, the information processing apparatus comprising:
   a setting changing unit configured to acquire a setting file and to generate a first instruction to the printer driver to change a setting value of each of different types of default setting information managed by the printer driver to a setting value designated by the setting file; and
   a default setting information storage unit configured to store system default setting information that differs with each printing system and driver default setting information initially managed by the printer driver,
   wherein the default setting information as print setting information includes setting items and corresponding setting values designated by the setting file,
   wherein the printer driver changes the setting value of each of the different types of the default setting information to the setting value designated by the setting file according to the first instruction without referring to a user interface of the printer driver,
   wherein the different types of the default setting information include user default setting information that differs with each user account, the system default setting information, and the driver default setting information, and
   wherein, when the printer driver receives a second instruction for resetting the print setting information managed by the printer driver, the printer driver resets the print setting information based on the system default setting information or the driver default setting information.

2. The information processing apparatus according to claim 1, further comprising:
   a determination unit configured to determine whether the first instruction is valid for each of different types of the default setting information based on authority information of a user who uses the printer driver,
   wherein, if the determination unit determines that the first instruction is valid, the printer driver changes the setting value of each of different types of the default setting information to the setting value designated by the setting file according to the first instruction.

3. A method for an information processing apparatus having a printer driver corresponding to a printing apparatus, the method comprising:

acquiring a setting file;

generating a first instruction to the printer driver to change a setting value of each of different types of default setting information managed by the printer driver to a setting value designated by the setting file; and storing system default setting information that differs with each printing system and driver default setting information initially managed by the printer driver, wherein the default setting information as print setting information includes setting items and corresponding setting values designated by the setting file, wherein the printer driver changes the setting value of each of different types of the default setting information to the setting value designated by the setting file according to the first instruction without referring to a user interface of the printer driver, wherein the different types of the default setting information include user default setting information that differs with each user account, the system default setting information, and the driver default setting information, and wherein, when the printer driver receives a second instruction for resetting the print setting information managed by the printer driver, the printer driver resets the print setting information based on the stored system default setting information or the driver default setting information.

4. The method according to claim 3, further comprising:

determining whether the first instruction is valid for each of the different types of the default setting information based on authority information of a user who uses the printer driver, wherein, if it is determined that the first instruction is valid, the printer driver changes the setting value of each of the different types of the default setting information to the setting value designated by the setting file according to the first instruction.

5. A non-transitory computer-readable storage medium storing instructions which, when executed by an information processing apparatus having a printer driver corresponding to a printing apparatus, causes the information processing apparatus to perform a method comprising:

acquiring a setting file;

generating a first instruction to the printer driver to change a setting value of each of different types of default setting information managed by the printer driver to a setting value designated by the setting file; and storing system default setting information that differs with each printing system and driver default setting information initially managed by the printer driver, wherein the default setting information as print setting information includes setting items and corresponding setting values designated by the setting file, wherein the printer driver changes the setting value of each of different types of the default setting information to the setting value designated by the setting file according to the first instruction without referring to a user interface of the printer driver, wherein the different types of the default setting information include user default setting information that differs with each user account, the system default setting information, and the driver default setting information, and wherein, when the printer driver receives a second instruction for resetting the print setting information managed by the printer driver, the printer driver resets the print setting information based on the stored system default setting information or the driver default setting information.

* * * * *